Oct. 8, 1968     J. L. VIDTS     3,404,570
THERMOELECTRIC METHOD AND APPARATUS FOR RAPID
DETERMINATION OF SILICON IN CAST IRON
Filed May 25, 1966     2 Sheets-Sheet 1
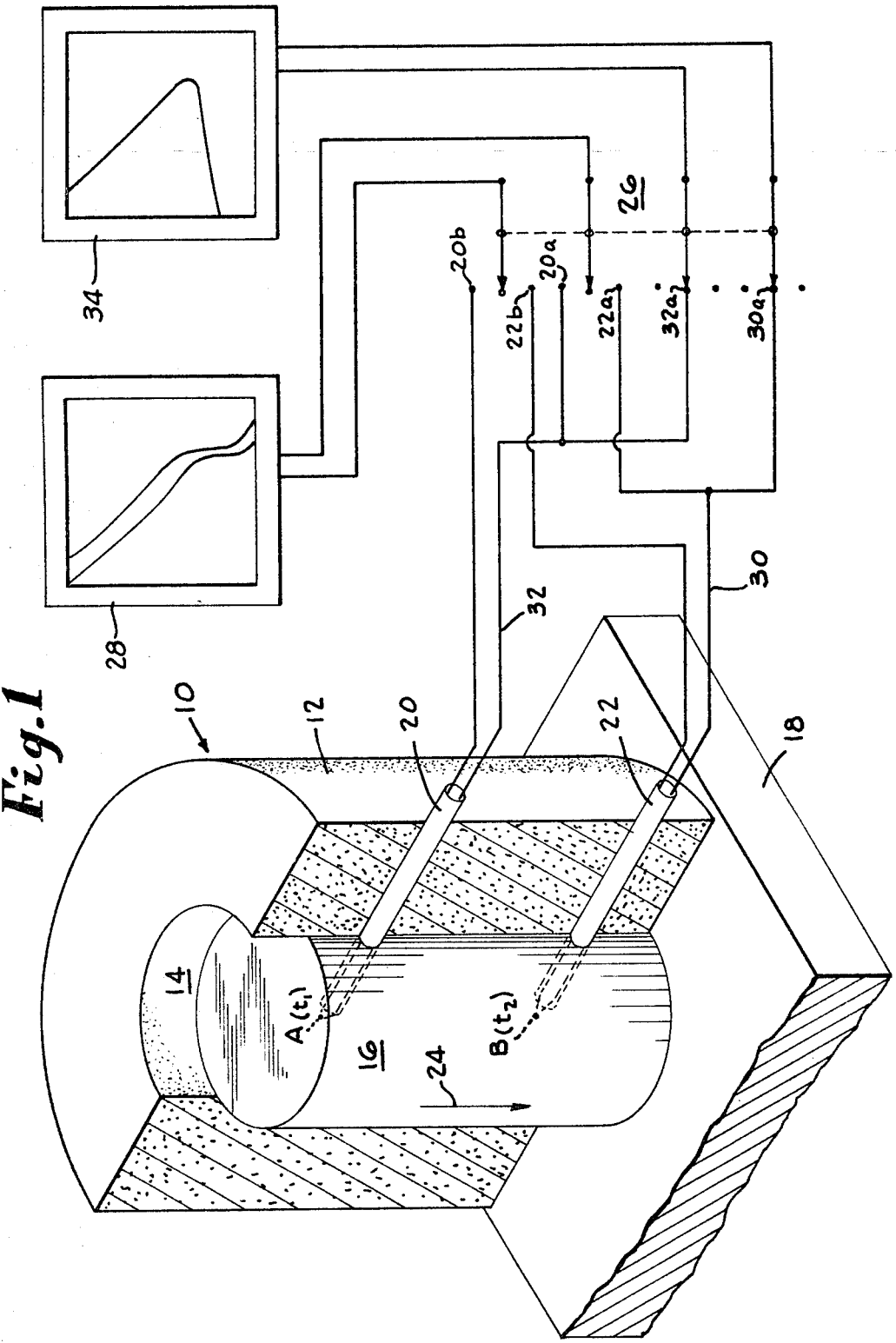

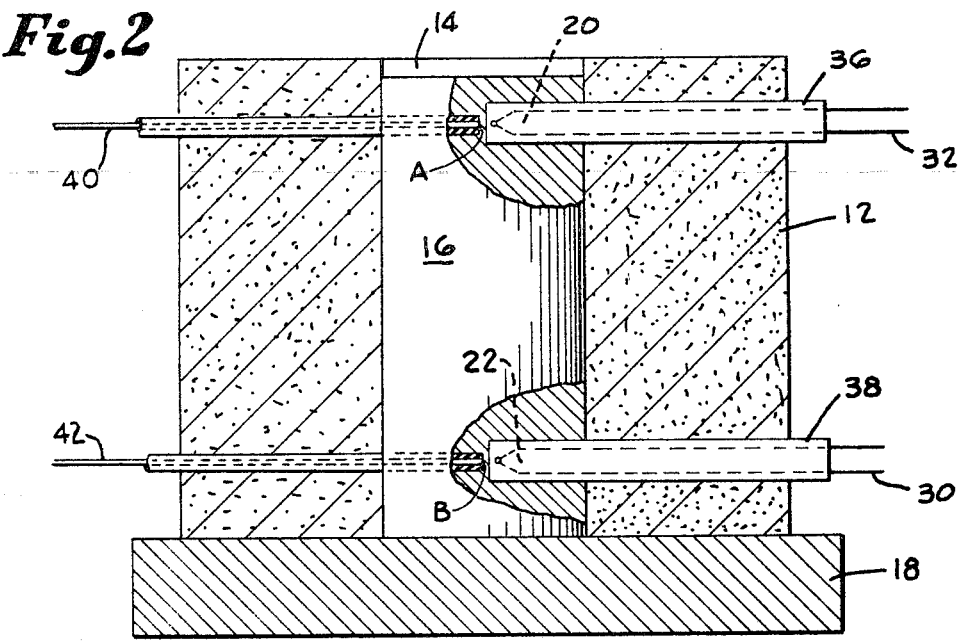
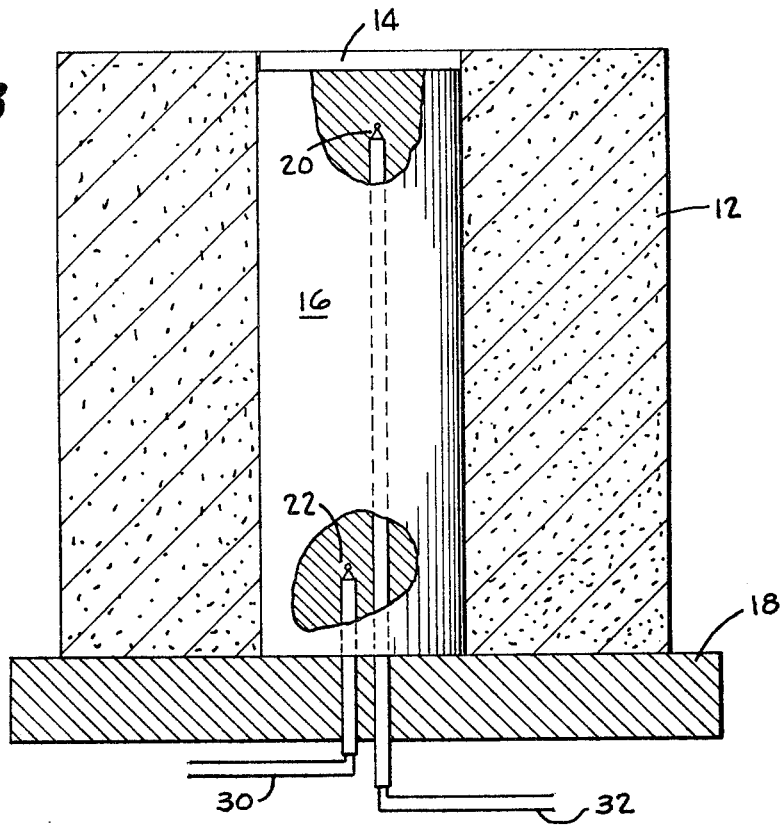

United States Patent Office 3,404,570
Patented Oct. 8, 1968

3,404,570
THERMOELECTRIC METHOD AND APPARATUS FOR RAPID DETERMINATION OF SILICON IN CAST IRON
Julien L. Vidts, 7 Christiaan Soenenslaan, St. Denijs-Westrem, Belgium
Filed May 25, 1966, Ser. No. 552,916
Claims priority, application Belgium, June 4, 1965, 665,030
14 Claims. (Cl. 73—341)

ABSTRACT OF THE DISCLOSURE

Method and apparatus for determining the concentration of a constituent (such as silicon) in a sample of an electrically conductive material (such as cast iron) by measuring in a poured sample of the material cooling in a manner such that a temperature gradient exists across the sample, the temperature and a thermoelectromotive force produced with the sample at each of two points in the sample spaced apart in the direction of the temperature gradient. The magnitude of the difference between the electromotive forces at a predetermined temperature difference between the points is representative of the concentration of the constituent.

---

This invention relates to the determination of the concentration of a constituent in a composition, and has for an object the provision of rapid and reliable means for determining the concentration of a constituent, such as silicon, in a sample of an electrically conductive material, such as cast iron, which means also affords, if desired, the determination of the concentration of carbon in the sample.

Thermoelectric methods for determining the silicon content of cast iron are known and have been reported in the literature [Bierwirth, Thermal Electric Determination of Silicon in Cast Iron, Giesserei, 45, No. 19, pp. 546–549 (1958); Van Oostenrijck, Thermoelectric Determination of Silicon, La Fonderie Belge, April 1965, pp. 109–117]. Such methods involve the measurement of the thermoelectric force produced between two points maintained at different temperatures at the surface of a completely cooled and mechanically prepared sample of the cast iron whose analysis is sought. The methods depend upon the phenomenon that when the temperature difference between the two points is maintained at a constant value the magnitude of the thermoelectric force produced between these two points will be representative of the concentration of silicon in the sample. However, such methods are handicapped in several respects: first they require the use of completely cooled and machined samples of the cast iron, thus reducing the speed at which the silicon analysis may be made. Second, the surface of the sample tested, if not representative of the sample, has been found to affect the analysis materially. Thirdly, and perhaps most importantly, deviations in the sample structure, i.e., the varied crystallinity and phase deviations in the cast iron sample constitute a serious limitation to the reliability of the analysis.

It is, therefore, a primary object of the present invention to provide a new and improved means for determining the concentration of a constituent in an electrically conductive material.

A further object of the invention is to provide a method for determining thermoelectrically the concentration of silicon in a cast iron sample.

Another object of the invention is to provide an apparatus for use in the thermoelectric determination of a constituent, such as silicon, in a sample of an electrically conductive material, such as cast iron.

Yet a further object of the invention is the provision of an improved method for determining the silicon concentration in a cast iron sample which affords the substantially simultaneous determination of the carbon equivalent of the sample.

Briefly stated, these as well as other objects may be attained in accordance with the invention one form of which includes the method for determining the concentration of silicon in a poured sample of cast iron cooling in a manner such that a temperature gradient exists across the sample comprising, determining, after solidification of said sample and while said sample is in the austenitic state, the temperature difference between two predetermined points in said sample spaced one from the other in the direction of the temperature gradient across said sample, and producing with said sample at each of said points a thermal electromotive force, the magnitude of the difference between the electromotive forces at a predetermined temperature difference between said points being representative of the concentration of silicon in said sample.

Generally speaking, the electromotive forces available at the two points in the sample, the magnitude of which difference is representative of the concentration of silicon in the cast iron at a given temperature difference between the two points, may be generated by producing a first thermoelectric junction between said sample and one of two electrical conductors at one of said points and producing a second thermoelectric junction between said sample and the other of said electrical conductors at the other of said points.

The method of the present invention eliminates the fundamental limitations of the prior art methods of thermoelectrically determining the silicon content of a cast iron sample. In accordance with this invention the measurement of the temperature difference between two points as well as the measurement of the magnitude of the difference in the thermal electromotive forces generated at each of said points is performed immediately after the cast iron sample solidifies and while the sample is in the austenitic state, thereby practically eliminating the influence of deviations in the structure of the sample as well as considerably increasing the speed with which a silicon analysis may be performed. Furthermore, the method of the invention enables determination of the carbon equivalent of the sample substantially simultaneously with the determination of the silicon content and with the same apparatus. This may be accomplished by continuously measuring the temperature at each of said predetermined points in the sample and continuously plotting the values of the temperature at each of said points as a function of time as the sample cools to provide a cooling curve from which the carbon equivalent of the cast iron sample may be determined, for example, as described by D. E. Krause, in an article entitled, "Rapid Control Test For Carbon Equivalent" in the May 1962 issue of "Foundry."

For further objects and advantages of the invention and for a more detailed description thereof, reference is to be had to the following description taken in conjunction with the accompanying drawings in which:

FIG. 1 is an isometric view, partly in section, of one embodiment of the invention, FIG. 2 is a cross-sectional view of another embodiment of the invention, and FIG. 3 is a cross-sectional view of a further embodiment of the invention.

Referring more particularly to the drawing, FIG. 1 illustrates means for measuring the concentration of silicon in cast iron in accordance with the invention including well or cup structure 10 comprising a mold 12 having walls or sand or other suitable refractory material whose mold cavity 14 defines a cooling zone adapted to receive a molten sample of cast iron 16. The floor or bottom of the mold cavity 14 comprises means for developing a temperature gradient across the sample of cast iron 16 after it fills the cavity, which means, is in the form of a metallic chill plate 18 supporting the circular mold and acting as a base therefor. The chill plate 18 may be composed of steel or other suitable material capable of acting as a heat sink, and should be of a size sufficient to impose a temperature gradient across the sample 16 as it cools in the mold.

Mold cavity 14 also includes a pair of thermocouples 20 and 22, spaced apart one from the other in the direction of the temperature gradient which, in the embodiment shown, will be in the direction of the arrow 24 designating the direction in which heat will flow from the sample 16 after it fills the zone 14 and begins to cool. Thus, the temperature $t_1$ at the point A measured by thermocouple 20 whill be higher during the cooling of said molten sample than the temperature $t_2$ at the point B measured by thermocouple 22 due to the spacing of point B closer to the chill plate 18 which acts as a heat sink developing the temperature gradient across the sample 16 as the sample cools. Accordingly, throughout the cooling of the sample of cast iron in the mold, there will exist a temperature gradient across the sample in the direction of the arrow 24 thereby resulting in a temperature differential, expressed as $t_1-t_2$ which will exist throughout the most part of the cooling cycle and until the temperature of the cast sample will approach the temperature of the ambient environment.

In accordance with the invention, a molten sample of cast iron is poured into the mold cavity 14 thereby enveloping the two thermocouples 20 and 22 whose uninsulated hot junctions are exposed in direct contact with the poured sample at points A and B respectively. The thermocouples are thus capable of measuring the temperature of the sample at these points as the sample cools. As shown, the thermocouples 20 and 22 may be connected through a switch 26 to a suitable recording device 28 such as a Speedomax H strip chart recorder manufactured by the Leeds & Northrup Company which can continuously plot the temperature. Switch 26 is operated in a manner to connect first one and than the other of the thermocouples 20 and 22 to the recorder 28 to produce cooling curves for each of the points A and B. The switch 26 is a multipoint switch and it will be noted that in moving from a position wherein thermocouple 22 is connected to recorder 28 (via contacts 22a and 22b), to a position where the thermocouple 20 is connected to recorder 28 (via contacts 20a and 20b), that contacts 30a, 32a have been provided for connecting to the recorder 34 thermocouple elements 30 and 32 respectively of thermocouples 22 and 20. A cycle time of about 5 seconds may be employed for a complete switching cycle, thereby producing substantially continuous chart records of the temperatures at each of the points A and B and the difference of the magnitude of the thermal electromotive force produced at those points. The thermal electromotive force at point A is produced by the thermoelectric junction formed between the sample and the element 32, and the thermal electromotive force at point B is produced by the thermoelectric junction formed between the sample and the element 30. As will be evident, the thermoelectric circuit is completed through the sample. Recorder 34 which plots the difference between these thermal electromotive forces may be of the same general type as recorder 28, the latter having a range of from 0 to 60 millivolts and the former having a range of from 0 to 1 millivolt. Generally speaking, these ranges of the recorders are selected for measuring temperatures in a range of values from 650° C. to 1400° C. with type K thermocouples as defined by the Instrument Society of America.

When the temperature difference between points A and B reaches a predetermined constant value after solidification of said sample and while it cools through the austenitic state, the measurement of the magnitude of the differernce in the electromotive forces generated at points A and B will be representative of the concentration of silicon in the sample. The carbon concentration of the sample may be easily determined by determining the carbon equivalent of the sample from the thermal arrest appearing on the plotted cooling curves as described in the aforesaid Krause article.

Referring now to the embodiment shown in FIG. 2, the two thermocouples 20 and 22 disposed in the sample 16 and measuring the temperature at points A and B in the sample have their hot junctions completely insulated from the cast iron sample 16 as by wells 36 and 38 respectively. As shown, the thermal electromotive force is generated at each of said points A and B respectively by means of a pair of electrical conductors 40, 42. The electromotive force at point A is generated by producing a first thermoelectric junction between the sample and the exposed end of electrical conductor 40, and the electromotive force is generated at point B by producing a second thermoelectric junction at that point between the sample 16 and the exposed end of the other of said electrical conductors 42. As in FIG. 1, the thermoelectric circuit is completed through the sample. The difference between the electromotive forces generated at each of said points A and B and the cooling curves for said points may be recorded in the manner described in FIG. 1. As previously stated, the magnitude of the electromotive force difference at a predetermined temperature difference between points A and B will be representative of the concentration of silicon in the cast iron sample 16. In this connection, electrical coductors 40 and 42 as well as the equipolar leads 32 and 30 of the two thermocouples 20 and 22 of FIG. 1 may be composed of a metal having a silicon content of less than 0.2% by weight to reduce the error in the silicon determination.

As will be evident, FIG. 3 discloses a well or cup structure substantially like that shown in FIGS. 1 and 2 except for the disposition of the thermocouples. In FIG. 3 the thermocouples are shown disposed vertically to emphasize the fact that the physical arrangement of the well structure, the thermocouples, and auxiliary conductors, when employed, may vary. It is, however, important that both thermocouples be always completely immersed and hence disposed at loactions which avoid exposure as a result of shrinking of the sample upon cooling.

It will further be apparent that a single multi-range recorder may be used instead of two recorders and that millivolt records or potentiometer type recorders may be used.

The present invention thus affords a convenient and rapid method for thermoelectrically determining the silicon content as well as the carbon equivalent in a cast iron sample. As will be appreciated by those skilled in the art, the present invention finds particular advantage by virtue of the fact that all measurements are made while the cast iron sample remains in the austenitic state and before any phase changes or crystallinity differences take place. Furthermore, the use of like molds of fixed design of identical volume and wall thickness thereby having comparable cooling characteristics as contemplated by the invention affords the measurement of relatively constant size samples under relatively identical conditions thereby enhancing the reliability of the method. The present invention is especially useful in foundries which produce specific types of cast iron over prolonged periods of time such that the deviations from one melt to the other of the respective types are relatively small. Thus, the effect of other alloying elements in the cast iron, and particularly of manganese, which is known to exhibit a significant influence on the reliability of a thermoelectric method for silicon determination, will be maintained at a minimum. Because the relationship of the silicon concentration and the magnitude of the difference of the thermal electromotive forces generated at two points in the sample will, to a great extent, depend upon not only the particular temperature differential at which the thermoelectric forces are measured but also upon the nature and quantity of other alloying elements present in the cast iron sample, a calibration curve establishing the relationship between the silicon concentration and the electromotive force differential at a particular temperature difference must be empirically determined for each type of cast iron regularly manufactured. This may be accomplished by comparing the silicon concentration of known samples of cast iron produced in the foundry with the magnitudes of the electromotive forces generated between the two points in a solidified poured sample at a particular temperature differential to establish a calibration curve. This curve will then be useful for the respective cast iron products produced by the foundry.

Although the present invention has been described in considerable detail with respect to the embodiments illustrated, it should be understood that the invention is not deemed to be so limited and is to be interpreted by the scope of the appended claims.

I claim:

1. The method for determining the concentration of a constituent in a sample of an electrically conductive material comprising,
    pouring a molten sample of said material into a cooling zone,
    establishing a temperature gradient across the poured sample during cooling thereof in said zone,
    determining, after solidification of said sample and while said sample is cooling, the temperature difference betwen two predetermined points in said sample spaced one from the other in the direction of said temperature gradient across said sample, and
    producing with said sample at each of said points a thermal electromotive force, the magnitude of the difference between the electromotive forces at a predetermined temperature difference between said points being representative of the concentration of said constituent in said sample.

2. The method of claim 13 including the steps of continuously measuring the temperature at each of said predetermined points and continuously plotting the values of the temperature at each of said points as a function of time as the sample cools to provide a cooling curve from which the carbon equivalent of said sample may be determined.

3. The method of claim 1 in which said electromotive force is generated by producing a first thermoelectric junction between said sample and an electrical conductor at one of said points, and producing a second thermoelectric junction between said sample and another electrical conductor at the other of said points.

4. The method of claim 3 in which the two electrical conductors comprise the equipolar leads of the two thermocouples used to determine the temperature at each of said two predetermined points in said sample.

5. The method of claim 3 in which the determination of the temperature difference between said two predetermined points includes the step of measuring the temperature at each of said points with a thermocouple electrically insulated from said sample.

6. The method of claim 3 in which each electrical conductor has a silicon content of less than 0.2% by weight.

7. Apparatus suitable for measuring the concentration of a constituent in an electrically conductive material comprising, in combination,
    well structure defining a cooling zone adapted to receive a molten sample of the electrically conductive material,
    means for developing a temperature gradient across the sample during cooling thereof, in said zone,
    means for determining during cooling in said zone of the sample, the temperature difference between two predetermined points in said zone spaced one from the other in the direction of the temperature gradient, and
    means cooperating with the sample during cooling thereof in said zone for producing therewith at each of said points a thermal electromotive force,
    the magnitude of the difference between the two electromotive forces generated at a predetermined temperature difference between said points being representative of the concentration of the constituent in the electrically conductive material.

8. Apparatus according to claim 7 in which said means for developing a temperature gradient comprises a heat sink adjacent said cooling zone.

9. Apparatus according to claim 7 in which said means for determining the temperature difference between said two predetermined points includes a pair of thermocouples.

10. Apparatus according to claim 7 in which said means cooperating with a sample during cooling thereof in said zone for producing therewith at each of said points an electromotive force comprises a pair of electrical conductors extending into said zone.

11. Apparatus according to claim 10 in which said means for determining the temperature difference between said two predetermined points includes a pair of uninsulated thermocouples, and each of said conductors comprises one element from each of said thermocouples.

12. Apparatus according to claim 11 in which said conductors comprise the equipolar elements of said thermocouples.

13. The method for determining the concentration of silicon in cast iron comprising,
    pouring a molten sample of cast iron into a cooling zone,
    establishing a temperature gradient across the poured sample of cast iron during the cooling of said sample,
    determining, after solidification of said sample and while said sample is cooling, the temperature difference betwen two predetermined points in said sample spaced one from the other in the direction of said temperature gradient across said sample, and
    producing with said sample at each of said points a thermal electromotive force, the magnitude of the difference between the electromotive forces generated at a predetermined temperature difference between said points being representative of the concentration of silicon in said sample.

14. The method of claim 13 in which the temperature difference between said two predetermined points is determined while said sample is in the austenitic state.

References Cited

UNITED STATES PATENTS

| | | | |
|---|---|---|---|
| 2,578,890 | 12/1951 | Ledin | 73—341 |
| 2,676,489 | 4/1954 | Basham | 73—154 XR |
| 2,825,222 | 3/1958 | Stone. | |
| 3,267,732 | 8/1966 | Hance | 73—359 |
| 3,321,973 | 5/1967 | Anderson | 73—359 |

OTHER REFERENCES

Leeibowitz, "Transducers for Control" Product Engineering 1962, pp. 54–55.

DAVID SCHONBERG, *Primary Examiner.*

NEIL B. SIEGEL, *Assistant Examiner.*